(12) United States Patent
Mantri et al.

(10) Patent No.: US 10,391,474 B2
(45) Date of Patent: Aug. 27, 2019

(54) PROCESS FOR PREPARATION OF HYDROCARBON FUEL FROM WASTE RUBBER

(71) Applicant: RELIANCE INDUSTRIES LIMITED, Mumbai (IN)

(72) Inventors: Kshudiram Mantri, Gujarat (IN); Mandan Chidambaram, Tamilnadu (IN); Ramesh Bhujade, Thane (IN); Nagesh Sharma, Vadodara (IN); Raksh Vir Jasra, Vadodara (IN)

(73) Assignee: Reliance Industries Limited, Mumbai (IN)

( * ) Notice: Subject to any disclaimer, the term of this patent is extended or adjusted under 35 U.S.C. 154(b) by 74 days.

(21) Appl. No.: 15/596,638

(22) Filed: May 16, 2017

(65) Prior Publication Data

US 2017/0247619 A1  Aug. 31, 2017

Related U.S. Application Data

(63) Continuation-in-part of application No. 14/652,283, filed as application No. PCT/IN2014/000313 on May 8, 2014, now Pat. No. 10,118,159.

(30) Foreign Application Priority Data

Sep. 6, 2013  (IN) .......................... 2899/MUM/2013

(51) Int. Cl.
| | | |
|---|---|---|
| *C10G 1/10* | (2006.01) |
| *C10G 1/06* | (2006.01) |
| *C07C 4/22* | (2006.01) |
| *C07C 4/08* | (2006.01) |
| *B01J 21/04* | (2006.01) |
| *B01J 37/08* | (2006.01) |
| *B01J 21/06* | (2006.01) |
| *B01J 23/46* | (2006.01) |
| *B01J 23/882* | (2006.01) |
| *B01J 23/883* | (2006.01) |
| *B01J 35/02* | (2006.01) |
| *B01J 35/08* | (2006.01) |
| *B01J 35/10* | (2006.01) |
| *B01J 37/00* | (2006.01) |
| *B01J 37/02* | (2006.01) |
| *B01J 27/24* | (2006.01) |

(Continued)

(52) U.S. Cl.
CPC .............. *B01J 21/04* (2013.01); *B01J 21/066* (2013.01); *B01J 23/464* (2013.01); *B01J 23/882* (2013.01); *B01J 23/883* (2013.01); *B01J 27/24* (2013.01); *B01J 29/85* (2013.01); *B01J 31/0237* (2013.01); *B01J 31/26* (2013.01); *B01J 31/38* (2013.01); *B01J 35/02* (2013.01); *B01J 35/023* (2013.01); *B01J 35/026* (2013.01); *B01J 35/08* (2013.01); *B01J 35/1014* (2013.01); *B01J 35/1019* (2013.01); *B01J 35/1023* (2013.01); *B01J 37/0009* (2013.01); *B01J 37/0203* (2013.01); *B01J 37/08* (2013.01); *C10B 57/12* (2013.01); *C10G 1/00* (2013.01); *C10G 1/06* (2013.01); *C10G 1/10* (2013.01); *C10G 3/45* (2013.01); *C10G 3/46* (2013.01); *C10G 3/47* (2013.01); *C10G 3/48* (2013.01); *C10G 3/49* (2013.01); *C10L 1/02* (2013.01); *C10L 9/086* (2013.01); *B01J 2231/005* (2013.01); *B01J 2531/005* (2013.01); *B01J 2531/008* (2013.01); *C10G 2300/1003* (2013.01); *C10G 2300/1011* (2013.01); *C10G 2300/1014* (2013.01); *Y02E 50/14* (2013.01); *Y02P 30/20* (2015.11)

(58) Field of Classification Search
CPC ................ C10G 1/10; C10G 1/06; C07C 4/22
See application file for complete search history.

(56) References Cited

U.S. PATENT DOCUMENTS

| | | | | | |
|---|---|---|---|---|---|
| 3,957,739 | A | * | 5/1976 | Cabestany | ................ C08F 2/24 526/207 |
| 5,079,385 | A | * | 1/1992 | Wu | ........................... C07C 4/00 585/241 |

(Continued)

FOREIGN PATENT DOCUMENTS

| | | | | |
|---|---|---|---|---|
| CA | 1 201 080 A1 | | 2/1986 | |
| CA | 2202941 | * | 4/1997 | ............... C07C 4/22 |

(Continued)

OTHER PUBLICATIONS

Matador Rubber (Rubber Chemistry, Matador Rubber s.r.o., 2007).*

(Continued)

*Primary Examiner* — Youngsul Jeong
(74) *Attorney, Agent, or Firm* — Ladas & Parry LLP

(57) ABSTRACT

The present disclosure provides a process for preparing a hydrocarbon fuel from waste rubber. The process involves admixing, in a reaction vessel, at least one fluid medium with the waste rubber to obtain a slurry; wherein the concentration of the waste rubber in the slurry ranges from 45% to 70%. A reactor is charged with the slurry and a predetermined amount of at least one catalyst composition to obtain a mixture, followed by introduction of hydrogen to the reactor to attain a predetermined pressure and heating the mixture at a predetermined temperature, to attain an autogenously generated pressure, and for a predetermined time period to obtain a reaction mass comprising the hydrocarbon fuel. This reaction mass comprising the hydrocarbon fuel is then cooled to obtain a cooled reaction mass. The hydrocarbon fuel is then separated from the cooled reaction mass.

12 Claims, No Drawings

(51) Int. Cl.

| | |
|---|---|
| *B01J 29/85* | (2006.01) |
| *B01J 31/02* | (2006.01) |
| *B01J 31/26* | (2006.01) |
| *B01J 31/38* | (2006.01) |
| *C10B 57/12* | (2006.01) |
| *C10G 1/00* | (2006.01) |
| *C10G 3/00* | (2006.01) |
| *C10L 1/02* | (2006.01) |
| *C10L 9/08* | (2006.01) |

(56) References Cited

U.S. PATENT DOCUMENTS

| | | | |
|---|---|---|---|
| 5,516,952 A * | 5/1996 | Lee | C07C 1/00 585/241 |
| 8,028,562 B2 * | 10/2011 | Shah | E21B 47/10 73/23.35 |
| 2011/0287503 A1 | 11/2011 | Lupton et al. | |
| 2012/0055077 A1 | 3/2012 | Savage et al. | |
| 2012/0094879 A1 | 4/2012 | Roberts | |

FOREIGN PATENT DOCUMENTS

| | | |
|---|---|---|
| EP | 1 880 760 A1 | 1/2008 |
| EP | 2 586 527 A1 | 5/2013 |
| WO | 2011/069510 | 6/2011 |
| WO | WO2013187788 A2 * 12/2013 | ............. C10B 53/07 |

OTHER PUBLICATIONS

International Search Report (ISR) dated Aug. 12, 2014 for Application No. PCT/IN2014/000313.

Rashmi Tiwari et al.; "Hydrotreating and Hydrocracking Catalysts for Processing of Waste Soya-Oil and Refinery-Oil Mixtures" Catalysis Communications vol. 12, Issue 6, Feb. 10, 2011, pp. 559-562 Abstract.

* cited by examiner

PROCESS FOR PREPARATION OF HYDROCARBON FUEL FROM WASTE RUBBER

CROSS REFERENCE TO RELATED APPLICATIONS

This application is a continuation-in-part (CIP) of U.S. patent application Ser. No. 14/652,283, filed on Jun. 15, 2015, which is a 371 of International Application PCT/IN2014/000313 filed on May 8, 2014 which designated the U.S., which claims the benefit of Indian Application No.: 2899/MUM/2013 filed on Sep. 6, 2013, the disclosure of each which are incorporated by reference herein.

FIELD

The present disclosure relates to a process for preparing hydrocarbon fuel from waste rubber.

DEFINITIONS

As used in the present disclosure, the following terms are generally intended to have the meaning as set forth below, except to the extent that the context in which they are used indicate otherwise.

Autogenous Pressure: Autogenous pressure is the pressure generated within a reaction vessel because of the the closed nature of the reaction vessel, without providing any external assistance.

BACKGROUND

Rubber has various applications like, for vehicle tires and conveyor belts, shock absorbers and anti-vibration mountings, pipes, and hoses, etc. It also serves some other specialistic applications such as in pump housings and pipes for handling of abrasive sludges, power transmission belting, diving gear, water lubricated bearings. etc. The general raw materials that make up these products are natural and synthetic rubbers, carbon, nylon or polyester cord, sulphur, resins and oil. These raw materials are virtually vulcanized into one compound (rubber) that is not easily broken down and makes it highly durable. This property of high durability makes the disposal of waste rubber an even more serious environmental problem as land filling is the most used disposal route.

However, concerns about conserving resources and energy have seen an increasing opposition to landfilling. Also, public sanitation and municipal waste management is often ineffective in developing countries and scrap tires are often found littering the streets. Rubber recovery can be a difficult process. There are many reasons, however Why waste rubber should be reclaimed or recovered or converted to value added products. It conserves non-renewable petroleum products, which are used to produce synthetic rubbers. If tires are incinerated to reclaim embodied energy then they can yield substantial quantities of useful power. However, such a recovery of waste rubber requires high operating costs and also the amount of rubber that is recovered is substantially low.

The problems of waste rubber can't be solved by landfilling or incineration, because rubber takes decades to decompose and causes land pollution and incineration increases the emission of harmful greenhouse gases, e.g., $CO_x$, $NO_x$, $SO_x$ and etc.

Rubber recycling is carried out by pyrolysis and/or chemical treatments for recovery of various raw materials from composite rubber, but most of these processes produce significant amount of C1-C5 gases or low molecular weight hydrocarbon liquids that are not suitable for automobile fuel oil.

There is, therefore, felt a need for a process for converting the value-eroded material (rubber) into a valuable product like crude or automobile fuel.

OBJECTS

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide a process for preparing a hydrocarbon fuel from waste rubber.

Another object of the present disclosure is to provide a hydrothermal liquefaction process for producing hydrocarbon fuel from waste rubber.

Yet another object of the present disclosure is to provide an environmentally friendly, simple, safe, and cost effective process for producing hydrocarbon fuel from waste rubber.

Other objects and advantages of the present disclosure will be more apparent from the following description, which is not intended to limit the scope of the present disclosure.

SUMMARY

The present disclosure provides a process for preparing a hydrocarbon fuel from waste rubber. The process involves a hydrothermal liquefaction in the presence of a catalyst and hydrogen. The process involves admixing, in a reaction vessel, at least one fluid medium with the waste rubber to obtain a slurry, wherein the concentration of waste rubber in the slurry ranges from 45% to 70%. Then a reactor is charged with the slurry and a predetermined amount of at least one catalyst composition to obtain a mixture, followed by introducing hydrogen to the reactor to attain a predetermined pressure and heating the mixture at a predetermined temperature to attain an autogenous pressure, and for a predetermined time period to obtain a reaction mass comprising the hydrocarbon fuel. This reaction mass comprising the hydrocarbon fuel is then cooled to obtain a cooled reaction mass from which the hydrocarbon fuel is obtained/separated.

Typically, the fluid medium is water. In an embodiment of the present disclosure, the at least one catalyst composition comprises at least one support, at least one promoter component impregnated on the at least one support, optionally at least one stabilizing agent and an active component comprising at least two active metals uniformly dispersed on the at least one support. In an embodiment of the present disclosure, the stabilizing agent helps in formulating the catalysts during metal impregnation. In yet another embodiment of the present disclosure, the stabilizing agent is absent in the final catalyst composition.

Typically, the at least one stabilizing agent is selected from the group consisting of hexamethyleneimine (HMI), ammonia solution, piperidine, pyrrolidine, morpholine, piperazine hydrate, 2-methyl cyclohexyl amine, and cyclohexylamine. Typically, the at least one support is selected from the group consisting of alumina, silica, zirconia, alumina-silica, zeolite, mesoporous silica, and mesoporous zeolites. In an embodiment of the present disclosure, the promoter component comprises at least one metal selected from the group consisting of Group III metals, Group IV metals, Group V metals, Group VI metals, Group VII metals, and Group VIII metals. Typically, the promoter component is at least one selected from the group consisting of cobalt, nickel, niobium, tantalum, gallium, yttrium, boron, phosphorous, ytterbium, dysprosium, promethium, and samarium. Typically, the active metal is at least one selected from the group consisting of Group VIB metals, Group VIIB metals, Group VIII metals, and noble metals. Typically, the active metal is at least one selected from the group consisting of Nickel (Ni), Molybdenum (Mo), Cobalt (Co), Platinum (Pt), Palladium (Pd), Ruthenium (Ru), and Rhodium (Rh). In an embodiment of the present disclosure, the amount of at least one promoter component is in the range from 0.01 to 2 wt % of the catalyst composition. In another embodiment of the present disclosure, amount of the active metal is in the range from 0.1 to 12 wt % of the catalyst composition. In yet another embodiment of the present disclosure, the support is in at least one form selected from the group consisting of spheres, extrudates, powder, and pellets. Typically, the cooled mass comprises gaseous products and solid products in the range of 4 to 22%. In an embodiment of the present disclosure, the predetermined pressure is in the range of 1-50 bar and the autogenously generated pressure is in the range of 70 to 300 bar. In another embodiment of the present disclosure, the predetermined temperature is in the range of 350 to 450° C. and the predetermined time is in the range of 5 to 60 minutes. Typically, the amount of said catalyst composition with respect to the waste rubber ranges from 1 to 20 wt %.

DETAILED DESCRIPTION

Interest in alternative and renewable biological sources of fuels has increased in recent years because of the growing shortage of fossil fuels and the rising environmental pollution, which are the two urgent problems the world is facing today. Increased market prices for energy and fuels are driven by a number of factors including depletion of easily accessible petroleum and natural gas deposits, growth of emerging economies, political instabilities, and mounting environmental concerns. Hence, there exists a need for processes for producing alternative sources of energy (fuels) and simultaneously reducing the environmental pollution.

In accordance with an embodiment of the present disclosure, there is envisaged a process for producing hydrocarbon fuel from rubber's, which does not require the step of up-gradation of the hydrocarbon fuel. The process of the present disclosure produces a minimal amount of gaseous and solid products along with the liquid hydrocarbon fuel. The process is carried out by hydrothermal liquefaction process (HTL) in the presence of a catalyst composition and hydrogen. Initially rubber is admixed with at least one fluid medium to make a slurry. The mixing of the fluid medium and waste rubber is carried out by stirring the mixture at a speed ranging from 450 rpm to 500 rpm for a time period ranging from 5 minutes to 60 minutes. The fluid medium is typically water. The concentration of waste rubber in the slurry ranges from 45% to 70%.

In the present disclosure, the hydrothermal liquefaction of the waste rubber is carried out in a batch reactor (reaction vessel). The slurry obtained in the above step is charged in a reactor along with at least one catalyst composition to obtain a mixture. Hydrogen is introduced in the reactor to attain a predetermined pressure and the mixture is heated at a predetermined temperature to generate an autogenous pressure for a predetermined time period to obtain a reaction mass. The reaction mass comprises the hydrocarbon fuel.

The catalyst composition used in the process of the present disclosure is a heterogeneous catalyst composition comprising at least one support, an active component comprising at least two active metals uniformly dispersed on the support with or without a promoter. The amount of catalyst composition used with respect to the waste rubber in the process of the present disclosure ranges from 1 wt % to 20 wt % depending on the reaction mass.

In an embodiment, the catalyst composition of the present disclosure comprises an active component comprising at least two metals uniformly dispersed on a support, at least one promoter component on the support, in predetermined quantities.

The catalyst composition as used in this process of the present disclosure has a dual functionality. The catalyst composition degrades the waste rubber into oil components and reforms the products into liquid hydrocarbon oil, which is free from heteroatoms such as oxygen, nitrogen, sulphur and the like. In an exemplary embodiment, the catalyst composition has the ability to enhance the rate of degradation of the waste natural rubbers, synthetic rubbers, composites and mixed rubbers. The catalyst also has the functionality of hydrodeoxygenation, hydrodenitrogenation, and hydrodesulphurization. The catalyst composition as used in the process of the present disclosure can be easily recovered and reused by any one of the simple processes selected from the group consisting of, but not limited to, filtration, washing, and drying.

Typically, the support of the catalyst composition is selected from the group consisting of oxides of alumina, silica, zirconia, alumina-silica, mesoporous silica, mesoporous zeolites, zeolite, and the like. A stabilizing agent may be used in the process of making the catalyst composition. The stabilizing agent, which can be used as a solubilizing agent, may be at least one selected from the group consisting of hexamethyleneimine (HMI), ammonia solution, piperidine, pyrrolidine, morpholine, piperazine hydrate, 2-methyl cyclohexyl amine, and cyclohexylamine.

Typically, the promoters used in the catalyst composition of the present disclosure are selected from the group consisting of Group III metals, Group IV metals, Group V metals, Group VI metals, Group VII metals, and Group VIII metals of the periodic table. The promoter is first impregnated on a carrier by an equilibrium method (promoter (metal) dissolved in water or any organic liquid medium) using a rotation process in the temperature range of 30 to 60° C. The concentration of the promoter on the support/carrier varies from 0.01 to 2 wt %. The active metals in the catalyst are selected from the group consisting of Group VIB metals, Group VIIB metals, Group VIII metals, and noble metals salts and mixtures thereof. The concentration of the active metal used in the process of the present disclosure is in the range of 0.1 to 12 wt % of the catalyst composition.

The promoter component is at least one selected from the group consisting of cobalt, nickel, niobium, tantalum, gallium, yttrium, boron, phosphorous, ytterbium, dysprosium, promethium, and samarium. The active metal is at least one selected from the group consisting of Nickel (Ni), Molybdenum (Mo), Cobalt (Co), Platinum (Pt), Palladium (Pd), Ruthenium (Ru), and Rhodium (Rh).

The predetermined temperature is in the range of 350 to 450° C. and the predetermined pressure is in the range of 1 to 50 bar. The predetermined time period is in the range of 5 to 60 minutes. The autogenously generated pressure is in the range of 70 to 300 bar. In an embodiment of the present disclosure, the autogenously generated pressure depends on the reaction temperature and reactant composition such as the solvent and the waste rubber content in the slurry. The autogenously generated pressure is in the range of 70 to 300 bar.

The reaction mass obtained after the hydrothermal liquefaction process is then cooled to 30° C. Liquid hydrocarbon fuel is a major component of the cooled reaction mass along with a minimal amount of gaseous and solid products. The separation of liquid hydrocarbon fuel is carried out simply by decanting the liquid hydrocarbon fuel from the cooled reaction mass.

The amount of liquid hydrocarbon fuel obtained, from the process of the present disclosure, from the waste rubber is in the range of 78 to 96% and the amount of gaseous and solid products is in the range of 4 to 22%. There is no formation of the carbon black in the reaction mass.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

EXPERIMENTAL DETAILS

Experiment 1

Production of Hydrocarbon Fuel 20 gm of waste rubber in the ground/shreded form (0.01-10 mm) was added to a reaction vessel along with 20 ml water and stirred for 15 minutes to obtain a slurry. 2.0 g of the catalyst composition was added to the reaction vessel followed by hydrogen gas till a pressure of 35 bars was attained in the reaction vessel. The reaction vessel was heated to attain a temperature of 415° C. and pressure of the reaction vessel was increased upto 250 bar. A reaction mass comprising the hydrocarbon fuel was obtained along with other gaseous and solid products.

The reaction mass was then cooled to a temperature of 30° C. and the hydrocarbon fuel was separated by decantation from the reaction mass.

The yield of liquid hydrocarbon fuel was 96%, that of gaseous product was 4% and solid product was Nil. Table 1 summarises the catalyst assisted performance of various rubbers with and without the use of catalyst.

TABLE 1

Catalyst assisted HTL performance.

| Entry No. | Type of waste | Catalyst | Reaction temp (° C.) | Reaction time (min) | Oil yield (wt %) |
| --- | --- | --- | --- | --- | --- |
| 1 | PBR | No catalyst | 415 | 15 | 79 |
| 2 | PBR | CoMo/Al2O3 | 415 | 15 | 92 |
| 3 | PBR | CoMo/P/Al2O3 | 415 | 15 | 96 |
| 4 | PBR | CoMo/Nb/Al2O3 | 415 | 15 | 96 |
| 5 | SBR | No catalyst | 415 | 15 | 78 |
| 6 | SBR | CoMo/Nb/Al2O3 | 415 | 15 | 96 |
| 7 | NR | No catalyst | 415 | 30 | 79 |
| 8 | NR | No catalyst | 415 | 15 | 79 |
| 9 | NR | CoMo/Nb/Al2O3 | 415 | 15 | 96 |
| 10 | NR | CoMo/Nb/Al2O3 | 375 | 30 | 96 |
| 11 | NR | CoMo/Nb/Al2O3 | 350 | 30 | 90 |
| 12 | EPDM | No catalyst | 415 | 15 | 76 |
| 13 | EPDM | CoMo/P/Al2O3 | 415 | 15 | 87 |

TABLE 1-continued

Catalyst assisted HTL performance.

| Entry No. | Type of waste | Catalyst | Reaction temp (° C.) | Reaction time (min) | Oil yield (wt %) |
| --- | --- | --- | --- | --- | --- |
| 14 | PBR + SBR + NR | CoMo/Nb/Al2O3 | 415 | 15 | 92 |
| 15 | PP + PBR + SBR + NR | CoMo/Nb/Al2O3 | 415 | 15 | 90 |

*Initial $H_2$ pressure 35 bar;
PBR—Poly Butyl Rubber;
PP—Polypropylene;
NR—Natural Rubber;
EPDM—Ethylene Propylene Diene Monomer;
SBR—Styrene Butyl Rubber;

Technical Advancements

The present disclosure described herein above has several technical advantages including, but not limited to, the realization of:

a simple, energy efficient, time saving, and high yielding process for the production of hydrocarbon fuel from waste rubber, a process for producing hydrocarbon fuel from waste rubber, which does not need a step of up-gradation;

a process for producing liquid hydrocarbon fuel from waste rubber which does not need the use of any organic solvent; and reuse of the catalyst in the next cycle of the process for production of hydrocarbon fuel from waste rubber; without affecting the hydrocarbon fuel yield.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for preparing hydrocarbon fuel from waste rubber; said process comprising the following steps:
   a. admixing, in a reaction vessel, water with said waste rubber to obtain a slurry; wherein a concentration of said waste rubber in said slurry ranges from 45% to 70 weight %;
   b. charging the reaction vessel with a predetermined amount of at least one catalyst composition to obtain a mixture;
   c. introducing hydrogen to said reaction vessel to attain a pressure in a range of 1 to 50 bar followed by heating said mixture for a predetermined time period, at a predetermined temperature to attain an autogenously generated pressure in a range of 70 to 300 bar to obtain a reaction mass comprising hydrocarbon fuel;
   d. cooling said reaction mass to obtain a cooled reaction mass; and
   e. separating said hydrocarbon fuel from said cooled reaction mass
      wherein said cooled reaction mass comprises liquid hydrocarbon fuel in a range of 78 to 96 weight % and gaseous products and solid products in a range of 4 to 22 weight %.

2. The process as claimed in claim 1, wherein said at least one catalyst composition comprises:
   i. at least one support;
   ii. at least one promoter component impregnated on said at least one support;
   iii. optionally at least one stabilizing agent;
   wherein said at least one stabilizing agent is selected from the group consisting of hexamethyleneimine (HMI), ammonia solution, piperidine, pyrrolidine, morpholine, piperazine hydrate, 2-methyl cyclohexyl amine, and cyclohexylamine; and
   iv. an active component comprising at least two active metals uniformly dispersed on said at least one support, and wherein said catalyst composition is a heterogeneous catalyst.

3. The process as claimed in claim 2, wherein said at least one support is selected from the group consisting of alumina, silica, zirconia, alumina-silica, zeolite, mesoporous silica, and mesoporous zeolites.

4. The process as claimed in claim 2, wherein said at least one promoter component comprises at least one metal selected from the group consisting of Group III metals, Group IV metals, Group V metals, Group VI metals, Group VII metals, and Group VIII metals.

5. The process as claimed in claim 2, wherein said at least one promoter component is at least one selected from the group consisting of cobalt, nickel, niobium, tantalum, gallium, yttrium, boron, phosphorous, ytterbium, dysprosium, promethium, and samarium.

6. The process as claimed in claim 2, wherein said at least two active metals are selected from the group consisting of Group VIB metals, Group VIIB metals, Group VIII metals, and noble metals.

7. The process as claimed in claim 2, wherein said at least two active metals are selected from the group consisting of Nickel (Ni), Molybdenum (Mo), Cobalt (Co), Platinum (Pt), Palladium (Pd), Ruthenium (Ru), and Rhodium (Rh).

8. The process as claimed in claim 2, wherein an amount of said at least one promoter component is in a range from 0.01 to 2 wt % of the at least one catalyst composition.

9. The process as claimed in claim 2, wherein an amount of said active metals is in-a range from 0.1 to 12 wt % of the at least one catalyst composition.

10. The process as claimed in claim 2, wherein said at least one support is in at least one form selected from the group consisting of spheres, extrudates, powder, and pellets.

11. The process as claimed in claim 1, wherein said predetermined temperature is in a range of 350 to 450° C. and said predetermined time is in a range of 5 to 60 minutes.

12. The process as claimed in claim 1, wherein the amount of said at least one catalyst composition with respect to said waste rubber ranges from 1 to 20 wt %.

* * * * *